(12) United States Patent
Delaviz et al.

(10) Patent No.: US 9,714,330 B2
(45) Date of Patent: *Jul. 25, 2017

(54) METHOD OF MANUFACTURING POLYSTYRENE FOAM WITH POLYMER PROCESSING ADDITIVES

(71) Applicant: Owens Corning Intellectual Capital, LLC, Toledo, OH (US)

(72) Inventors: Yadollah Delaviz, Lewis Center, OH (US); Bharat Patel, Princeton, NJ (US); Mark Polasky, Mogadore, OH (US); Roland R. Loh, Coppell, TX (US); Raymond M. Breindel, Hartville, OH (US); Mitchell Z. Weekley, Tallmadge, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 78 days.

This patent is subject to a terminal disclaimer.

(21) Appl. No.: 14/200,145

(22) Filed: Mar. 7, 2014

(65) Prior Publication Data

US 2014/0187657 A1 Jul. 3, 2014
US 2017/0114202 A9 Apr. 27, 2017

Related U.S. Application Data

(62) Division of application No. 11/259,970, filed on Oct. 27, 2005, now abandoned.

(51) Int. Cl.

| | |
|---|---|
| C08J 9/00 | (2006.01) |
| B23K 20/12 | (2006.01) |
| C23C 24/04 | (2006.01) |
| C08F 112/08 | (2006.01) |
| C08J 9/12 | (2006.01) |
| C08J 9/14 | (2006.01) |

(52) U.S. Cl.
CPC ......... *C08J 9/0023* (2013.01); *B23K 20/1225* (2013.01); *B23K 20/1275* (2013.01); *C08F 112/08* (2013.01); *C08J 9/122* (2013.01); *C08J 9/146* (2013.01); *C23C 24/04* (2013.01); *C08J 9/0028* (2013.01)

(58) Field of Classification Search
CPC ......... C08J 9/0023; C08J 9/0028; C08J 9/122
See application file for complete search history.

(56) References Cited

U.S. PATENT DOCUMENTS

| | | | |
|---|---|---|---|
| 3,870,841 A | 3/1975 | Makowski et al. | |
| 3,975,316 A * | 8/1976 | Villa | C08G 18/10 521/101 |
| 4,698,370 A | 10/1987 | Saeki et al. | |
| 5,082,608 A | 1/1992 | Karabedian et al. | |
| 5,229,429 A | 7/1993 | Hahn et al. | |
| 5,258,415 A | 11/1993 | Hahn et al. | |
| 5,340,844 A | 8/1994 | Welsh et al. | |
| 5,356,944 A | 10/1994 | Blythe et al. | |
| 5,443,769 A | 8/1995 | Karabedian et al. | |
| 5,565,497 A | 10/1996 | Godbey et al. | |
| 5,633,289 A * | 5/1997 | Nakamura | C08J 9/14 264/51 |
| 5,674,602 A | 10/1997 | Karabedian et al. | |
| 5,925,450 A | 7/1999 | Karabedian et al. | |
| 5,997,781 A | 12/1999 | Nishikawa et al. | |
| 6,093,352 A | 7/2000 | Miller et al. | |
| 6,225,364 B1 | 5/2001 | Chaudhary et al. | |
| 6,274,641 B1 | 8/2001 | Krupinski | |
| 6,437,048 B1 | 8/2002 | Saito et al. | |
| 6,455,601 B1 | 9/2002 | Singh et al. | |
| 6,572,800 B1 | 6/2003 | Ladera et al. | |
| 6,710,095 B2 | 3/2004 | Araulio-McAdams et al. | |
| 8,119,701 B2 * | 2/2012 | Delaviz et al. | 521/97 |
| 2002/0193459 A1 * | 12/2002 | Haseyama | B29C 44/348 521/155 |
| 2003/0035660 A1 | 2/2003 | Sugino et al. | |
| 2004/0014830 A1 | 1/2004 | Weise et al. | |
| 2004/0087754 A1 * | 5/2004 | Foley | C08G 18/664 528/59 |
| 2004/0143068 A1 | 7/2004 | Honda et al. | |
| 2004/0162359 A1 | 8/2004 | Barber et al. | |
| 2004/0186194 A1 | 9/2004 | Joern et al. | |
| 2004/0242715 A1 | 12/2004 | Loh et al. | |
| 2005/0112356 A1 | 5/2005 | Rynd et al. | |
| 2005/0260400 A1 | 11/2005 | Schweitzer et al. | |
| 2006/0148916 A1 | 7/2006 | Kloh et al. | |
| 2007/0090552 A1 | 4/2007 | Delaviz et al. | |
| 2007/0142487 A1 | 6/2007 | Miller et al. | |
| 2007/0173554 A1 | 7/2007 | Delaviz et al. | |
| 2007/0208094 A1 | 9/2007 | Hyanda et al. | |
| 2007/0213418 A1 | 9/2007 | Vermilion et al. | |
| 2011/0144221 A1 | 6/2011 | Delaviz et al. | |

FOREIGN PATENT DOCUMENTS

| | | |
|---|---|---|
| CN | 1057228 | 12/1991 |
| CN | 1170662 | 1/1998 |

(Continued)

OTHER PUBLICATIONS

Office action from Canadian Application No. 2,626,307 dated Aug. 6, 2014.

(Continued)

*Primary Examiner* — Melissa Rioja
(74) *Attorney, Agent, or Firm* — Calfee, Halter & Griswold LLP (57) ABSTRACT

Disclosed is a method for making polystyrene foam which utilizes one or more atmospheric gases, particularly $CO_2$, as the blowing agent in combination with a polymer processing aid (PPA), typically an ester that is relatively non-volatile at the extrusion temperature range. The blowing agent and the PPA may both be introduced into the molten thermoplastic polystyrene resin or the PPA may be incorporated in the solid source polystyrene resins. The resulting foam will be substantially free of residual blowing agent and dimensionally stable at ambient temperatures.

13 Claims, 3 Drawing Sheets

(56) References Cited

FOREIGN PATENT DOCUMENTS

| | | |
|---|---|---|
| DE | 10241298 | 3/2004 |
| EP | 276452 | 8/1998 |
| JP | 10-036548 | 2/1998 |
| JP | 2005-343938 | 12/2005 |
| MX | 228950 | 7/2005 |
| MX | 280372 | 10/2010 |
| WO | 95/04765 | 2/1995 |
| WO | 96/30439 | 10/1996 |
| WO | 99/31170 | 6/1999 |
| WO | 01/29140 | 4/2001 |
| WO | 03/014220 | 2/2003 |
| WO | 2007/050468 | 5/2007 |
| WO | 2007/050478 | 5/2007 |
| WO | 2009/148445 | 12/2009 |

OTHER PUBLICATIONS

Office action from U.S. Appl. No. 11/257,301 dated Dec. 12, 2007.
Office action from U.S. Appl. No. 11/257,301 dated Sep. 11, 2008.
Office action from U.S. Appl. No. 11/257,301 dated Feb. 19, 2009.
Office action from U.S. Appl. No. 11/257,301 dated Sep. 30, 2009.
Office action from U.S. Appl. No. 11/257,301 dated Mar. 30, 2010.
Office action from U.S. Appl. No. 11/257,301 dated Nov. 16, 2010.
Notice of Allowance from U.S. Appl. No. 11/257,301 dated Jul. 14, 2011.
Office action from U.S. Appl. No. 11/259,970 dated Dec. 13, 2007.
Office action from U.S. Appl. No. 11/259,970 dated Aug. 5, 2008.
Interview Summary from U.S. Appl. No. 11/259,970 dated Sep. 29, 2008.
Notice of Panel Decision from Pre-Appeal Brief Request from U.S. Appl. No. 11/259,970 dated Nov. 6, 2008.
Examiner's Answer from U.S. Appl. No. 11/259,970 dated May 13, 2009.
Office action from U.S. Appl. No. 11/259,970 dated Oct. 5, 2009.
Office action from U.S. Appl. No. 11/259,970 dated Sep. 16, 2010.
Office action from U.S. Appl. No. 11/259,970 dated Jan. 20, 2011.
Office action from U.S. Appl. No. 11/259,970 dated Sep. 1, 2011.
Interview Summary from U.S. Appl. No. 11/259,970 dated Sep. 29, 2011.
Office action from U.S. Appl. No. 11/259,970 dated Dec. 20, 2012.
Office action from U.S. Appl. No. 11/259,970 dated Nov. 22, 2013.
Interview Summary from U.S. Appl. No. 12/996,032 dated Dec. 28, 2012.
Office action from U.S. Appl. No. 12/996,032 dated Mar. 11, 2013.
Office action from U.S. Appl. No. 12/996,032 dated Jul. 10, 2013.
Office action from U.S. Appl. No. 12/996,032 dated Feb. 4, 2014.
International Search Report from PCT/US06/41121 dated May 29, 2008.
International Search Report from PCT/US06/41186 dated Apr. 14, 2008.
International Search Report from PCT/.US08/65780 dated Feb. 23, 2009.
Office action from Canadian Application No. 2,626,307 dated Dec. 31, 2012.
Office action from Canadian Application No. 2,626,307 dated Nov. 25, 2013.
Office action from Chinese Application No. 200680044295.6 dated Jul. 28, 2011.
Office action from Chinese Application No. 200680044295.6 dated Nov. 3, 2010.
Office action from Chinese Application No. 200880129613.8 dated Apr. 6, 2012.
Office action from European Application No. 08874566.6 dated May 15, 2012.
Office action from Mexican Application No. 08/05375 dated May 24, 2012.
Office action from Mexican Application No. 08/05375 dated Nov. 30, 2012.
Office action from Mexican Application No. 08/05375 dated Jul. 1, 2013.
Office action from Mexican Application No. 08/05375 dated Apr. 24, 2014.
Office action from Mexican Application No. 10/13201 dated Aug. 19, 2013.
Office action from Mexican Application No. 10/13201 dated May 6, 2014.
Office action from Canadian Application No. 2,725,102 dated Oct. 2, 2014.
Office action from U.S. Appl. No. 14/200,135 dated Jan. 29, 2016.
Office action from U.S. Appl. No. 14/200,135 dated Jan. 13, 2017.
Office action from Canadian Application No. 2,883,548 dated Apr. 24, 2015.
Office action from U.S. Appl. No. 14/200,135 dated Jul. 6, 2015.

\* cited by examiner

METHOD OF MANUFACTURING POLYSTYRENE FOAM WITH POLYMER PROCESSING ADDITIVES

RELATED APPLICATIONS

This application is a divisional application of U.S. Ser. No. 11/259,970, filed Oct. 27, 2005 titled METHOD OF MANUFACTURING POLYSTYRENE FOAM WITH POLYMER PROCESSING ADDITIVES, the entire disclosure of which is incorporated herein by reference.

REFERENCE TO GOVERNMENT RIGHTS

This invention was made with Government support under Advanced Technology PROGRAM (ATP) Grant No. 70NANB2H3023 awarded by the National Institute of Standards and Technology (NIST). The Government may have certain rights to this invention.

TECHNICAL FIELD AND INDUSTRIAL APPLICABILITY

This invention relates to processes for forming polymeric foams, particularly to the manufacture of extruded polystyrene (XPS) foams in the absence of chlorofluorocarbon and fluorocarbon blowing agents by using one or more esters, particularly adipates, benzoates and dibenzoates, as polymer processing aids (PPA) for improving the appearance and properties of the resulting foam, and more particularly to processes for preparing extruded polystyrene foam products from polystyrene blends using carbon dioxide as a primary blowing agent.

The invention relates to compositions and methods for producing extruded polystyrene (XPS) foam board suitable for insulation applications, particularly for exterior insulation finish system (EIFS) for building construction.

BACKGROUND OF THE INVENTION

In the traditional production of polystyrene (PS) foams using an extrusion process, it was common to utilize as blowing agents one or more halocarbons, such as methyl chloride, ethyl chloride, chlorocarbons, fluorocarbons (including HFCs) and chlorofluorocarbons (CFCs) including dichlorodifluoromethane, fluorohydrocarbons or chlorofluorohydrocarbons (which are also referred to as "soft CFCs", "HCFCs" or "HFCs"). Examples of such halocarbons include a range of CFCs such as CFC-11 (chlorotrifluoromethane), CFC-12 (dichlorodifluoromethane), and CFC-113 (1,2,2-trifluoro-1,1,2-tri-chloroethane), and hydrohalocarbons, also referred to as "soft" CFCs, HCFCs and HFCs, including HCFC-22 (chlorodifluoromethane), HCFC-123 (1,1-dichloro-2,2,2-trifluoroethane), HCFC-142b (1-chloro-1,1-difluoroethane), HFC-134a (1,1,1,2-tetrafluoroethane), HFC-152a (1,1-difluoroethane), and HCFC-141b (1,1-dichloro-1-fluoroethane.

The general procedure utilized in the preparation of extruded synthetic foam bodies generally includes the steps of melting a base polymeric composition, incorporating one or more blowing agents and other additives into the polymeric melt under conditions that provide for the thorough mixing of the blowing agent and the polymer while preventing the mixture from foaming prematurely, e.g., under pressure. This mixture is then typically extruded through a single or multi-stage extrusion die to cool and reduce the pressure on the mixture, allowing the mixture to foam and produce a foamed product. As will be appreciated, the relative quantities of the polymer(s), blowing agent(s) and additives, the temperature and the manner in which the pressure is reduced will tend to affect the qualities and properties of the resulting foam product.

The solubility of chlorofluorocarbons and certain alkanes in polystyrene tends to reduce the extrusion melt viscosity and improve cooling of expanded polystyrene (PS) melts. For example, the combination of pentane and a chlorofluorocarbon such as Freon 11 and 12 is partially soluble in polystyrene and has been used for generating polystyrene foams that exhibited a generally acceptable appearance and physical properties such as surface finish, cell size and distribution, orientation, shrinkage and stiffness.

However, in response to the apparent contribution of such CFC compounds to the reduction of the ozone layer in Earth's stratosphere, the widespread use and accompanying atmospheric release of such compounds in applications such as aerosol propellants, refrigerants, foam-blowing agents and specialty solvents has recently been drastically reduced or eliminated by government regulation. Although certain of the "soft" CFCs such as certain hydrofluorocarbons (HFC's) including 1,1,1,2-tetrafluoroethane (HFC-134a) and 1,1-difluoroethane (HFC-152a) are thought to be much more ozone friendly and have been considered as alternative blowing agents. However, these alternative compounds are expensive, tend to be less soluble in polystyrene, tend to have higher thermal conductivity than HCFC's and may still contribute to global warming.

Hydrocarbons such as pentane, hexane, cyclopentane and other homologs of this series have also been considered, but they are highly flammable and volatile, thereby raising both safety and VOC emission concerns. Carbon dioxide is an attractive candidate as a blowing agent, from both the environmental and economic standpoints. The challenges associated with successfully using $CO_2$ as a blowing agent are, however, significant in light of the relatively low solubility, high diffusivity and poor processability of $CO_2$ in polystyrene resins. $CO_2$ also has an increased thermal conductivity relative to that of HCFC-142b and HFC-134a, with $CO_2$-blown foam exhibiting about 17% and about 10% lower overall product insulation values respectively than corresponding foams produced with HCFC-142b and HFC-134a.

Other previous attempts have utilized alcohols, such as ethanol, or hydrocarbon, such as cyclopentane, in conjunction with $CO_2$ to improve the processability and enable the production of extruded polystyrene foam board having desired or target physical and thermal properties. The problems with co-blowing agents such as alcohols or hydrocarbons are their flammability, safety and the negative impact on flame performance and insulation properties of the end product.

Conventional processes include polymer foam processes for making thermoformed articles wherein the blowing agent comprises a mixture of at least an atmospheric gas and at least one volatile plasticizing blowing agent. Previous attempts to mix normally liquid hydrocarbons and normally gaseous blowing agents have generally achieved only limited success and have tended to require great care in order to produce acceptable polymer foams using highly-volatile blowing agents such as carbon dioxide.

SUMMARY OF THE INVENTION

The objectives of the present invention include providing an improved method of making polymeric foams using one or more atmospheric gases as a blowing agent in combination with at least one ester, particularly an adipate ester, as a polymer processing aid.

In an exemplary embodiment of the invention, extruded polystyrene foams are prepared from a polymeric melt, typically one that includes a high melt flow polystyrene as the primary polymeric component, an atmospheric gas such as $CO_2$ as the primary blowing agent and at least one polymer processing aid selected from a group of esters, especially adipates having a bis(n-R) structure, wherein R is aliphatic (linear, cyclic and branched, saturated and unsaturated) or aromatic with a preferred adipate being bis(n-decanyl) adipate.

In an exemplary embodiment of the invention, the polymer melt will be prepared from a major portion of one or more styrenic polymers that exhibit a high melt index, e.g., a melt index of at least about 10.0 (g/10 minutes) (as measured according to ASTM D 1238, Condition L) that is combined with no more than about 5 wt % of bis(n-decanyl) adipate as a polymer processing aid and less than about 4 wt % $CO_2$ as a blowing agent, In an exemplary embodiment of the invention, the polymer melt will be prepared from preformed styrenic polymers or copolymers that may have been precompounded with bis(n-decanyl) adipate. Alternatively or additionally, the bis(n-decanyl) adipate can be injected directly into the polymeric melt at an intermediate position along the screw extruder path. In addition to the bis(n-decanyl) adipate, other processing aids may be incorporated in the preformed styrenic polymers or may be injected into the melt as it moves through the extruder. The blowing agent(s), such as $CO_2$, is also injected into the polymeric melt at an intermediate portion along the screw extruder path. In any event, each of the additives and blowing agent(s) should be introduced into the polymeric melt sufficiently upstream of the extrusion die to ensure that adequate blending is achieved before the composition reaches the extrusion die.

In accordance with the invention, the method of making polystyrene foam comprises mixing an atmospheric gas such as carbon dioxide, nitrogen or air and at least one a non-volatile blending agent into a polystyrene melt. The polystyrene melt may also include one or more nucleating agents such as talc, sodium bicarbonate or citric acid. The mixture of the polystyrene melt, the atmospheric gas and the blending agent are then emitted through an extrusion die, thereby reducing the pressure and allowing the blowing agent to expand and form polystyrene foam. Depending on the concentration of the blowing agent and the extrusion conditions, the resultant foam may have substantially no residual blowing agent and will exhibit acceptable foam and surface properties.

DESCRIPTION OF THE DRAWINGS

Example embodiments of the invention will be apparent from the more particular description of certain example embodiments of the invention provided below and as illustrated in the accompanying drawings.

These drawings have been provided to assist in the understanding of the example embodiments of the invention as described in more detail below and should not be construed as unduly limiting the invention. In particular, the number, relative spacing, positioning, sizing and dimensions of the various elements illustrated in the drawings are not drawn to scale and may have been exaggerated, reduced or otherwise modified for the purpose of improved clarity.

DETAILED DESCRIPTION OF EXEMPLARY EMBODIMENTS

Figure 1:
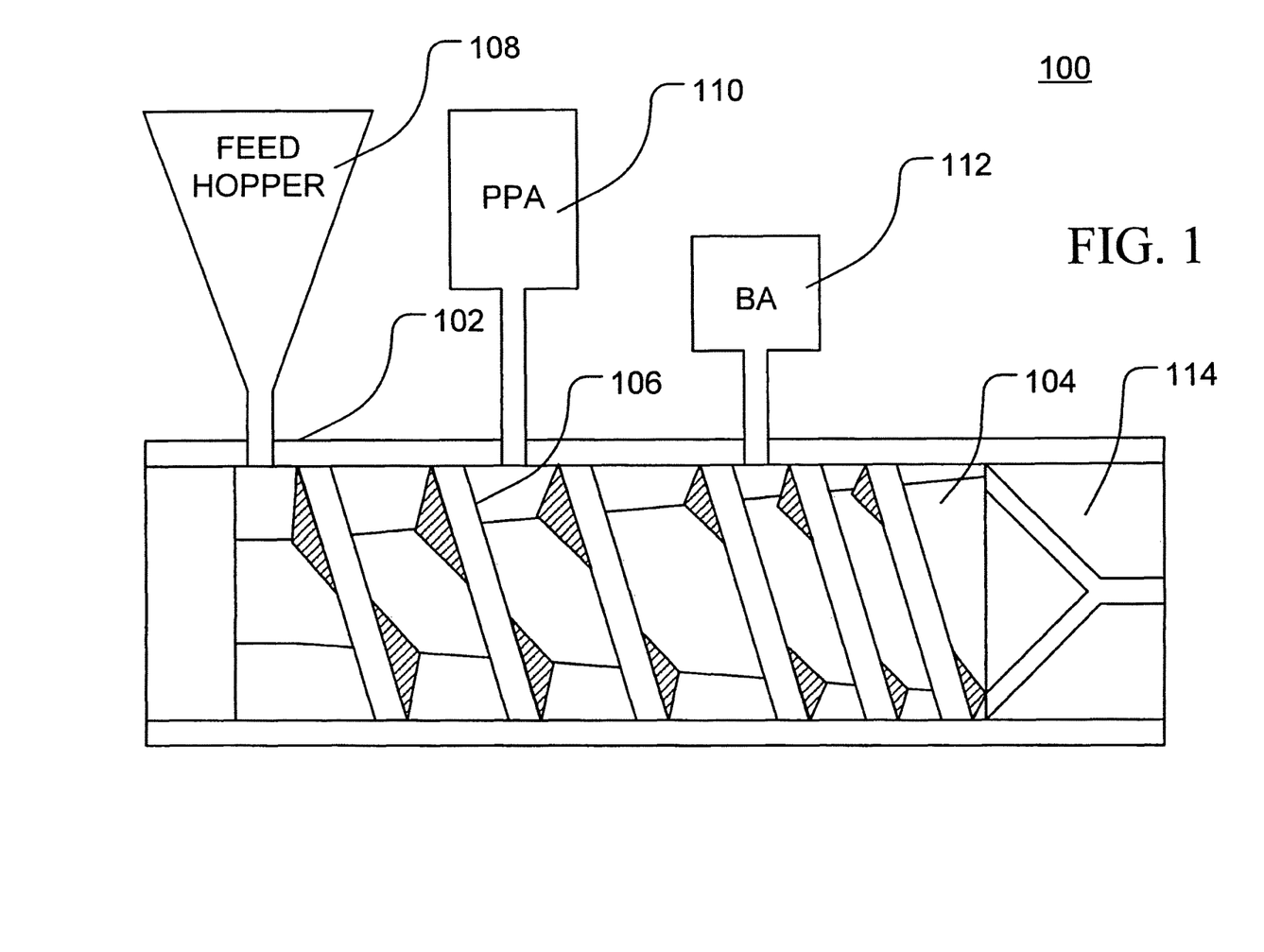
FIG. 1 is a schematic drawing of an exemplary extrusion apparatus useful for practicing methods according to the invention.

As illustrated in FIG. 1, an extrusion apparatus 100 useful for practicing methods according to the invention may comprise a single or double (not shown) screw extruder including a barrel 102 surrounding a screw 104 on which are provided a spiral flight 106 configured to compress, and thereby, heat material introduced into the screw extruder. As illustrated in FIG. 1, the basic polymeric composition can be feed into the screw extruder as a flowable solid, such as beads, granules or pellets, or as a liquid or semiliquid melt, from one or more (not shown) feed hoppers 108.

As the basic polymeric composition advances through the screw extruder, the decreasing spacing of the flight 106, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

As the polymer composition advances through the screw extruder 100, one or more ports may be provided through the barrel 102 with associated apparatus 110 configured for injecting one or more polymer processing aids into the polymer composition. Similarly, one or more ports may be provided through the barrel 102 with associated apparatus 112 for injecting one or more blowing agents into the polymer composition. Once the polymer processing aid(s) and blowing agent(s) have been introduced into the polymer composition, the resulting mixture is subjected to some additional blending sufficient to distribute each of the additives generally uniformly throughout the polymer composition to obtain an extrusion composition.

This extrusion composition is then forced through an extrusion die 114 and exits the die into a region of reduced pressure (which may be below atmospheric pressure), thereby allowing the blowing agent to expand and produce a polymeric foam layer or slab. The polymeric foam may be subjected to additional processing such as calendaring, water immersion, cooling sprays or other operations to control the thickness and other properties of the resulting polymeric foam product.

Figure 2:
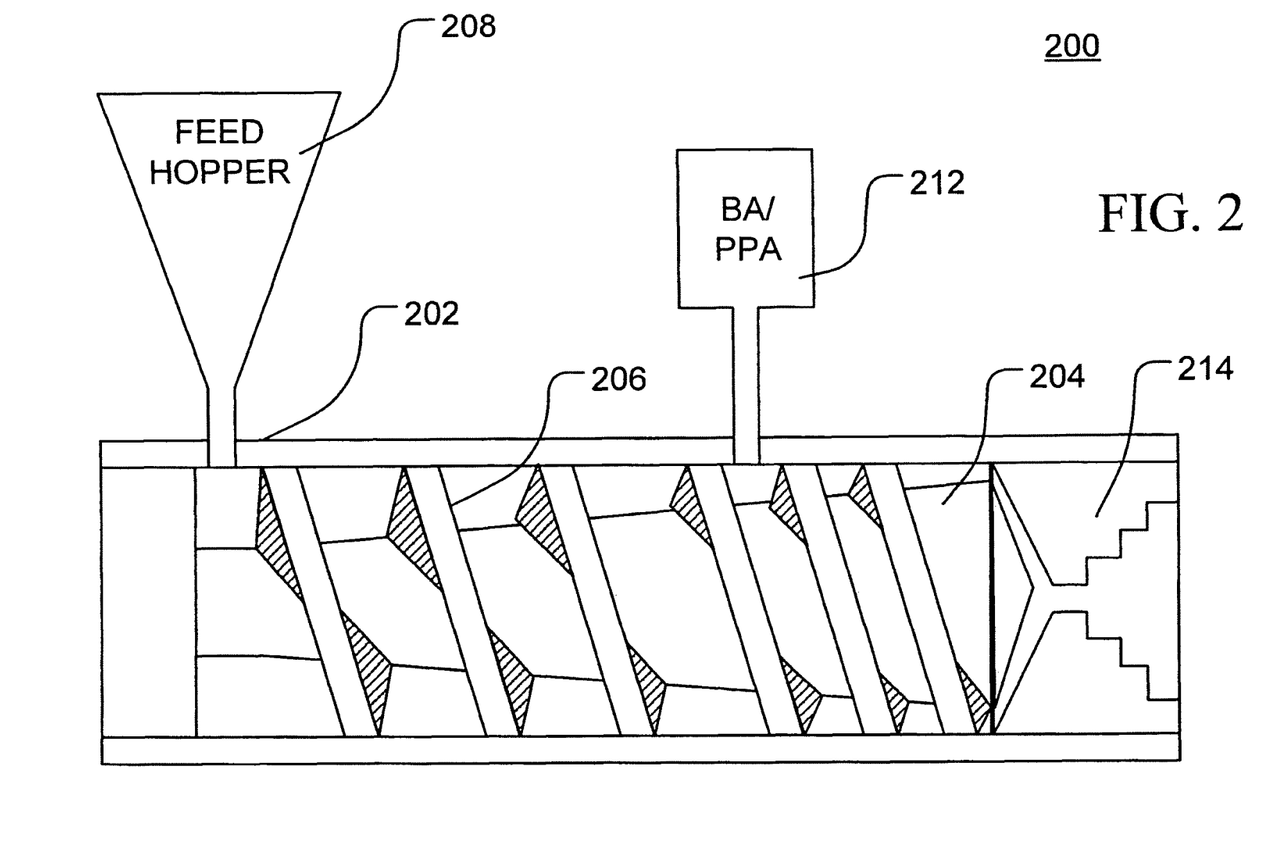
FIG. 2 is a schematic drawing of another exemplary extrusion apparatus useful for practicing methods according to the invention.

As illustrated in FIG. 2, an extrusion apparatus 200 useful for practicing methods according to the invention may comprise a single or double (not shown) screw extruder including a barrel 202 surrounding a screw 204 on which are provided a spiral flight 206 configured to compress, and thereby, heat material introduced into the screw extruder. As illustrated in FIG. 2, the basic polymeric composition, optionally compounded with one or more polymer processing aids, can be feed into the screw extruder as a flowable solid, such as beads, granules or pellets, or as a liquid or semiliquid melt, from one or more (not shown) feed hoppers 208.

As the basic polymeric composition advances through the screw extruder, the decreasing spacing of the flight 206, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

le;.5qAs the polymer composition advances through the screw extruder 200, one or more ports may be provided through the barrel 202 with associated apparatus 212 configured for injecting one or more blowing agents and, optionally one or more polymer processing aids, into the polymer composition. Once the desired quantities of polymer, polymer processing aid(s) and blowing agent(s) have been introduced into the screw extruder, the resulting mixture is subjected to some additional blending sufficient to distribute each of the additives generally uniformly throughout the polymer composition to obtain an extrusion composition.

This extrusion composition is then forced through an extrusion die 214 and exits the die into a region of reduced pressure (which may be below atmospheric pressure), thereby allowing the blowing agent to expand and produce a polymeric foam layer or slab. As illustrated in FIG. 2, this pressure reduction may be obtained gradually as the extruded polymeric mixture advances through successively larger openings provided in the die or through some suitable apparatus (not shown) provided downstream of the extrusion die for controlling to some degree the manner in which the pressure applied to the polymeric mixture is reduced. The polymeric foam may also be subjected to additional processing such as calendaring, water immersion, cooling sprays or other operations to control the thickness and other properties of the resulting polymeric foam product.

thereby improve the uniformity in the production of different thicknesses of polystyrene foam board using an atmospheric gas such as air, $N_2$ or, preferably, $CO_2$ as the primary blowing agent.

The polymeric composition will preferably be a styrenic polymer and/or another polymer having a sufficiently high melt flow index (MFI or melt flow number), e.g., a melt flow index of at least about 10 (g/10 minutes), thereby increasing the $CO_2$ solubility relative to that which can be achieved with polystyrenes having a MFI of less than 10. This polymeric composition may then be combined with minor amount of a polymer processing aid, typically an ester and preferably an adipate ester according to the general Formula I provided below:

wherein X is nitrogen or oxygen, $R^1$ is selected from a group consisting of $C_1$-$C_{20}$ alkyl, aryl or alkaryl and $R^2$ and $R^3$ are independently selected from a group consisting of hydrogen, $C_1$-$C_{20}$, preferably $C_6$-$C_{16}$, and more preferably $C_8$-$C_{13}$, aliphatic (linear, cyclic and branched, saturated and unsaturated) and aromatic (substituted and unsubstituted) groups (and are generally identical), alkaryl and alkoxylate, wherein $R^2$ and $R^3$ cannot both be H. Representative compounds are represented by Formulas II-IV as provided below:

| ADIPATE ESTER | FORMULA |
|---|---|
| $CH_3-CH_2-CH_2-CH(C_2H_5)-CH_2-CH_2-O-C(=O)-(CH_2)_4-C(=O)-O-CH_2-CH_2-CH(C_2H_5)-CH_2-CH_2-CH_3$ | II |
| $C_{10}H_{21}-O-C(=O)-(CH_2)_4-C(=O)-O-C_{10}H_{21}$ | III |
| $C_{13}H_{25}-O-C(=O)-(CH_2)_4-C(=O)-O-C_{13}H_{25}$ | IV |

Exemplary methods according to the invention may utilize one or more of a variety of blowing agents to achieve the desired polymeric foam properties in the final product. In general, the polymeric composition will include at least a major portion of a high melt flow polystyrene (e.g., a polystyrene having a melt flow index of at least about 10 g/10 minutes (as measured according to ASTM D 1238 Condition L) using an atmospheric gas, preferably $CO_2$, as the primary blowing agent.

In addition to the $CO_2$, one or more polymer processing aids (PPA) selected from a group of esters, particularly adipate esters, and more particularly bis(n-R) adipate esters, wherein R is selected from a group consisting of $C_6$-$C_{16}$, and preferably $C_8$-$C_{13}$, aliphatic (linear, cyclic and branched, saturated and unsaturated) and aromatic (substituted and unsubstituted) groups, particularly compounds such as bis (n-decanyl) adipate. The processing aid(s) will improve the stability of the extrusion pressure/temperature profile and

In addition to the adipate esters detailed above, benzoates generally corresponding to the general Formula V and reproduced below may be useful for increasing the solubility of $CO_2$ in polymeric compositions, such as polystyrene.

wherein X is nitrogen or oxygen, $R^5$ is selected from a group consisting of $C_1$-$C_{20}$ alkyl, aryl, alkaryl and alkoxylate. Suitable compounds corresponding to the general structure illustrated in Formula V for use in this invention are illustrated below as Formulas VI-X:

In addition to the adipate esters and benzoates detailed above, dibenzoates generally corresponding to the general Formula XI and reproduced below may be useful for increasing the solubility of CO$_2$ in polymeric compositions, such as polystyrene.

wherein X is nitrogen or oxygen, R$^4$ is selected from a group consisting of C$_1$-C$_{20}$ alkyl, aryl, alkaryl and alkoxylate. Suitable compounds corresponding to the general structure illustrated in Formula V for use in this invention are illustrated below as Formulas XII-XVI:

A minor portion, typically less than about 5 wt %, preferably less than about 3 wt % or, perhaps, even less than about 2 wt % of a PPA, such as an adipate polymer processing aid, can be used in combination with a similar or greater concentration of the blowing agent(s). For example, bis(n-decanyl) adipate (Formula III) can be incorporated into a polymeric system or melt at a rates as low as about 0.5 wt % and still exhibit improvements to the CO$_2$ solubility, extrusion process stability as reflected by temperature/pressure profiles of the process to produce foam board exhibiting improved dimensional stability. The esters, and particularly adipate esters, will tend to outperform smaller alcohol compounds, such as ethanol, for maintaining the properties of the resulting foam board products, particularly when CO$_2$ is used as the only blowing agent.

In those instances in which the PPA is available as a liquid at or near room temperature, such as bis(n-decanyl) adipate, the PPA may be pumped through an injector and into an intermediate point in the movement of the polymeric composition through the extrusion device or extruder. Accordingly, for systems or apparatus that incorporated suitable liquid handling equipment, such as the assemblies that were utilized to inject one or more conventional PPA's such as ethanol, these same assemblies can be utilized to inject one or more of the new PPAs.

Other PPA additives such as bis(3-ethylhexyl) adipate (Formula II) and bis(n-tridecanyl) (Formula IV) and other similar compounds tend to exhibit similar effects with regard to improving the processability of CO$_2$ in the polymeric melt. Other polymers and copolymers such as styrene methyl methacrylate (SMMA) copolymers can also be utilized as the polymeric composition in methods according to the present invention and can be processed on the same apparatus as general purpose crystalline polystyrene.

With respect to copolymers in particular, utilizing bis(n-decanyl) adipate as a PAA in a SMMA copolymer composition having a S:MMA molar ratio of about 80:20 is able to support about 5 wt % CO$_2$ in the extrusion composition. This polymeric composition and PPA additive scheme tends to increase blowing power and reduce the cooling demands associated with the resulting polystyrene foam board products.

Several of the PAAs, including the bis(n-decanyl) adipate, can be compounded with other polymers and copolymers such as ethylene methyl acrylate and added directly to the flowable particles, beads, pellets or other compounded forms and tend to exhibit similar effects on the foaming process in general and improving CO$_2$ solubility within the polymeric composition. The PAA compound(s) can be incorporated into the melt through direct injection into the extruder or through precompounding (blending) the PAA compound(s) with one or more of the other compatible polymers or additives to achieve similar effective concentrations in the final extrusion composition and thereby produce similar effects.

It was also noted by the inventors that the presence of bis(n-decanyl) adipate (Formula III) appears to increase the solubility of HFC-134a in the polymeric composition. Accordingly, presence of bis(n-decanyl) adipate helps support polymeric compositions using combinations of blowing agents such as HFC-134a/$CO_2$ as well as the addition of water as a co-blowing agent to produce polystyrene foam board with desired properties.

EXAMPLES

A series of experiments were conducted in order to investigate the relative performance of the invention and conventional practices in the production of XPS products. Each of the trials used amorphous, general-purpose crystal polystyrene (specifically PS NC0038 from NOVA Chemical) having a melt flow index of 5-30 (g/10 min) (ASTM D 1238 Condition L), 0.78 wt % of bis(n-decanyl) adipate, 1.0 wt % of hexabromocyclodecane as a flame retardant and 0.2 wt % talc as nucleating agent. This mixture was then fed into a twin screw extruder having a screw diameter of 132 mm. The solids are melted, and then mixed with 3.7 wt % of $CO_2$.

From the extruder, the plastified foamable mixture was cooled to a second temperature (generally referred to as die melt temperature) and extruded into a region of reduced pressure to form a foam product. In this instance, the mixture was cooled to a die melt temperature of 116° F. (about 47° C.) and was then ejected through a die opening (27 cm×1.41 mm) into a region of lower pressure. Exemplary samples according to the invention were generated by foaming the mixture under both atmospheric pressure (101.3 kPa) and subatmospheric pressure conditions, specifically a vacuum of 8, 12 or 16 inches of Hg (about 74.3, 60.8 and 47.3 kPa respectively).

Comparative samples were prepared using HCFC-142b (11 wt % based on the polymer content) as the blowing agent and using a combination of $CO_2$ (3.7 wt %) and ethanol (1.5 wt %) as a blowing agent system. Additional exemplary samples were produced using $CO_2$ (3.7 wt %) and bis(n-decanyl) adipate (Formula III) (0.5 wt %) as a blowing agent system. The low level of bis(n-decanyl) adipate helps foam surface characteristics and at the same time enhances polymer melt processability The die pressure fluctuation usually is an indication of how any of the polymeric blowing agent system processes on the pilot line. As one can see from FIG. 1 the overall pressure changes is not significant, as comparing the above mentioned systems.

Figure 3:
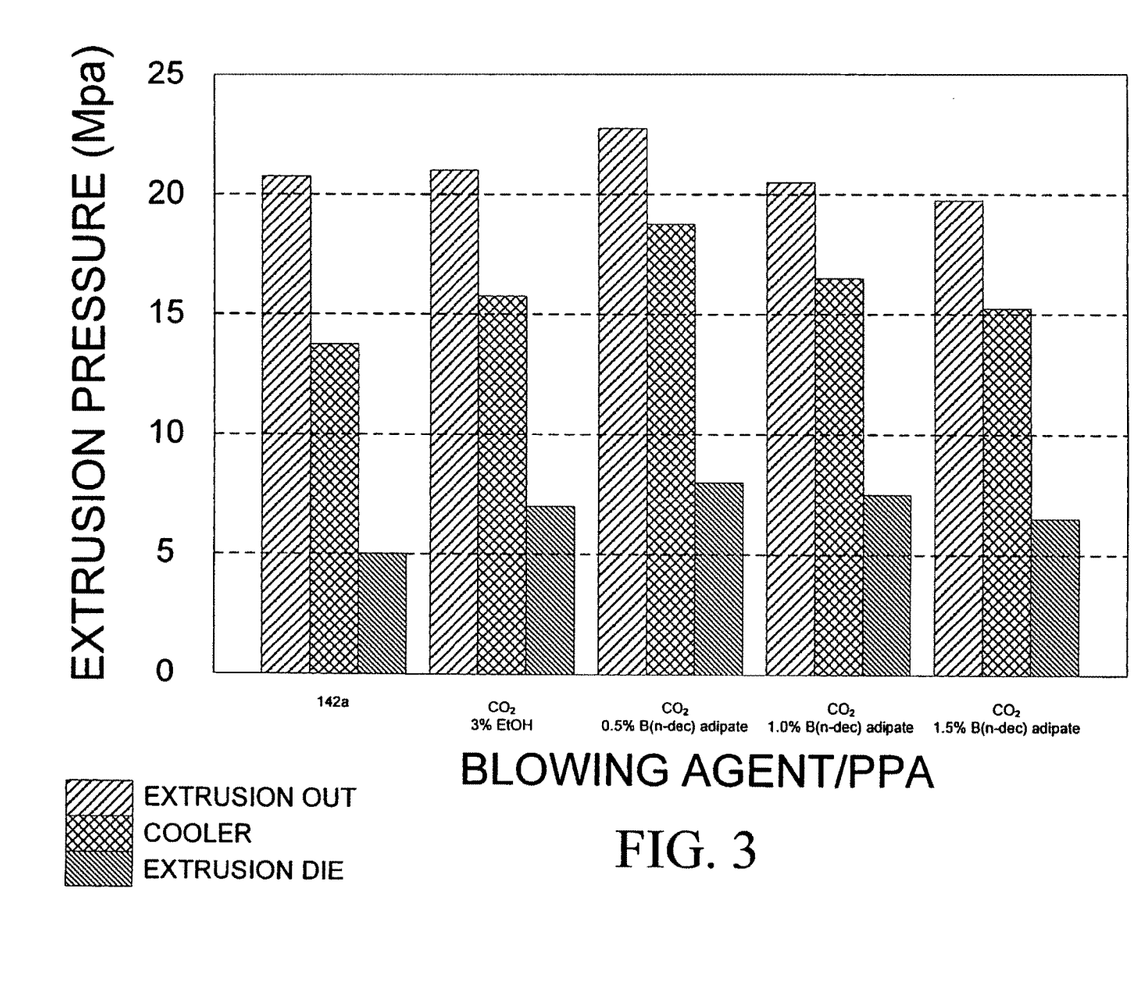
FIG. 3 is a chart illustrating pressure measurements obtained using a variety of comparative and demonstrative compositions and methods.

FIG. 3 shows a comparison between current HCFC-142b 11%, $CO_2$ 3.7%/ethanol 1.5% and $CO_2$ 3.7%/bis(n-decanyl) adipate at 0.5%, 1.0% and 1.5% levels with the respective extrusion out pressure, static cooler pressure and die pressure monitored on pilot line runs with these compositions. For the 142b system (control) general purposes PS (NOVA 1220) with melt flow index of 1.6 (g/10.0 minutes) was used. For $CO_2$/ethanol and all other runs PS high melt flow index 10.0 (g/10 minutes) (NOVA NN0038) was been used. Attempts were made to produce foam board have a thickness of around 1 inch (about 25.4 mm) while keeping all other process parameters relatively constant.

Although FIG. 3 shows the extrusion pressures at atmospheric condition, this relationship appears to hold true for 10 inches of Hg (about 67.5 kPa) (or any other vacuum levels) as well too. These results were achieved on an Owens Corning pilot line facility at Tallmadge, Ohio. The extrusion pressure profile is an indication of ease of process ability and blowing agent solubility in the melt. Although, the extrusion out, cooler and die pressures for $CO_2$/bis(n-decanyl) adipate system were higher relative to the conventional 142b system, they were very comparable to the $CO_2$/ethanol system. In fact $CO_2$/bis(n-decanyl) adipate at 1.5% level outperforms $CO_2$/Ethanol system in terms of ease of process ability.

Later during the trials the polymer was switched to a S:MMA 80:20 (NOVA NC0044) copolymer. Because the process appeared relatively stable, we increased the $CO_2$ incrementally to 4.3% to increase both the blowing potential and the cooling capabilities. This higher $CO_2$ level provided acceptable products with a good surface under atmospheric conditions. Apparently the presence of the PPA bis(n-decanyl) adipate combined with more polar and high melt index S:MMA copolymer helps increase the solubility of $CO_2$ in the polymer system. The ability to dissolve more $CO_2$ has huge impact on cooling power of the BA system and ease of process ability. The results of the trials are reported below in TABLE 1. Average cell size, compressive modulus, percentage of open cells and R-value were all measured.

R-value, or total thermal resistance, is the measure of the resistance of heat transfer. The method of determining R-value is described as follows. Thermal conductivity, k is defined as the ratio of the heat flow per unit cross-sectional to the temperature drop per unit thickness with the US unit:

$$\frac{Btu \cdot in}{Hr \cdot Ft^2 \cdot °F.}$$

And the metric unit:

$$\frac{W}{m \cdot k}$$

The heat transfer through an insulating material can occur through solid conductivity, gas conductivity, radiation, and convection. The total thermal resistance (R-value), R is the measure of the resistance to heat transfer, and is determined as:

$$R = t/k$$

Where, t=thickness.

There were some notable physical properties differences between boards made using HCFC-142b, $CO_2$/ethanol and $CO_2$/bis(n-decanyl) adipate, Table 1. The board becomes weaker as the level of bis(n-decanyl) adipate increases from 0.5 to 1.5%, a results which suggests a higher degree of plasticization. Also, apparently as a result of the increasing concentrations of bis(n-decanyl) adipate, the open cell content tended to increase accordingly.

Additional trials were run using PS NC0038 (NOVA Chemicals) with both HFC-134a 7%/$CO_2$ 0.5%/bis(n-decanyl) adipate 1.5% and HFC-134a/bis(n-decanyl) adipate 1.5% as the blowing compositions on the same pilot line used to generate the HFC-142b discussed above. These trials produced PS foams having 2.25 pcf densities with an open cell content of only about 2.29%, a value which is well within the acceptable range. In both of these runs, an additional 0.2% ethyl methyl acrylate polymer was used to improve foam board surface quality.

TABLE 1

| Foam Board Properties | | | | | |
|---|---|---|---|---|---|
| | CO$_2$ (3.7 wt %) | | | | |
| | HCFC-142b | Ethanol | (Formula I) | (Formula II) | (Formula III) |
| Average cell (mm) | 0.213 | 0.151 | 0.154 | 0.16 | 0.172 |
| Compressive modulus (psi) | 1261 | 1300 | 971 | | 723 |
| Open cell, % | 0.42 | 2.74 | 3.55 | 4.52 | 6.81 |
| R-value (per inch) | 5.0 | 4.2 | 4.2 | 4.2 | 4.2 |

As noted above, the disclosed apparatus and methods of making polystyrene based foam products using one or more atmospheric gases and/or a halohydrocarbon as the primary blowing agent(s) in combination with a polymer processing aid comprising one or more esters, particularly adipates, benzoates and dibenzoates. Further, as the polystyrene foam is extruded, the melt can be foamed and cooled to a degree sufficient to maintain generally normal process levels and can, accordingly, be controlled with conventional practices for obtaining foam products adapted for particular final uses. These conventional practices may be adapted for use with the present invention to provide some degree of control over the foam density and cell size while utilizing conventional extrusion apparatus and post-extrusion processing.

Although the invention has been described in the context of particular polystyrene foam materials, the inventive method is also applicable to other polymeric compositions and various combinations of blending agents to obtain a variety of polymeric foam materials. Example embodiments of the invention have been disclosed herein and, although specific terms are employed, they are used and are to be interpreted in a generic and descriptive sense only and not for purpose of limitation. Accordingly, it will be understood by those of ordinary skill in the art that various changes in form and details of the disclosed apparatus and methods may be made without departing from the spirit and scope of the invention as set forth in the following claims.

What is claimed is:

1. A method of manufacturing a polymeric foam product, the method comprising:
   preparing a polymeric melt from a major amount of a polystyrene polymer and a minor amount of at least one additive according the formula:

wherein X is nitrogen or oxygen, and wherein R$^5$ is selected from the group consisting of C$_1$-C$_{20}$ alkyl, aryl, alkaryl, and alkoxylate;
   injecting carbon dioxide into the polymeric melt to form a foamable mixture; and
   extruding the foamable mixture through a die into a region of reduced pressure.

2. A method of manufacturing a polymeric foam product according to claim 1, wherein the at least one additive is selected from the group consisting of:

3. A method of manufacturing a polymeric foam product according to claim 1, wherein the at least one additive provides a density of about 2.25 pcf in the polymeric foam product.

4. A method of manufacturing a polymeric foam product according to claim 1, wherein the amount of the at least one additive is adjusted to provide a desired open cell content in the polymeric foam product.

5. A method of manufacturing a polymeric foam product according to claim 1, wherein the polystyrene polymer and the at least one additive are precompounded prior to the injection of carbon dioxide.

6. A method of manufacturing a polymeric foam product according to claim 1, further comprising injecting one or more blowing agents in addition to said carbon dioxide into the polymeric melt to form the foamable mixture.

7. A method of manufacturing polymeric foam according to claim 6, wherein the one or more additional blowing agents comprises a hydrofluorocarbon (HFC).

8. A method of manufacturing polymeric foam according to claim 7, wherein the one or more additional blowing agents comprise 1,1,1,2-tetrafluoroethane (HFC-134a).

9. A method of manufacturing polymeric foam according to claim 6, wherein the carbon dioxide comprises less than about 4% by weight of the foamable mixture.

10. A method of manufacturing polymeric foam according to claim 9, wherein the carbon dioxide comprises between about 0.5% by weight and about 1.5% by weight of the foamable mixture.

11. A method of manufacturing polymeric foam according to claim 6, wherein the at least one additive comprises less than about 1% by weight of the foamable mixture.

12. A method of manufacturing polymeric foam according to claim 6, wherein the at least one additive comprises from about 0.5% by weight to about 1.5% by weight of the foamable mixture.

13. A foam board manufactured by the method of claim 6.

* * * * *